INVENTOR
OSCAR ARMANDO SANCHEZ AGUILERA

June 5, 1956

O. A. S. AGUILERA 2,748,892

APPARATUS FOR IMPROVING FUEL FOR
INTERNAL COMBUSTION ENGINES

Filed Nov. 9, 1951

INVENTOR
OSCAR ARMANDO SANCHEZ AGUILERA

BY Mead, Browne, Schuyler & Beveridge his ATTORNEYS

United States Patent Office 2,748,892
Patented June 5, 1956

2,748,892

APPARATUS FOR IMPROVING FUEL FOR INTERNAL COMBUSTION ENGINES

Oscar Armando Sanchez Aguilera, Mexico City, Mexico

Application November 9, 1951, Serial No. 255,702

3 Claims. (Cl. 183—19)

This invention refers to a new apparatus to improve the combustion of hydrocarbon fuels used in internal combustion engines, resulting in a notable increase in the engines' power and consequent reduction in fuel consumption.

It has been observed that carbon deposit in the cylinders and pistons of internal combustion engines result from the incomplete combustion of fuel, due to insufficient oxygen. Thus, many devices have been designed and constructed to provide an optimum mixture of fuel and air. A better combustion may be obtained, as well as a certain reduction in the carbon deposit, but these devices do not provide a notable increase in power.

In order to remedy this deficiency, as it is not practically possible to introduce great air masses mechanically, to improve the combustion this invention utilizes ozone ($O_3$), which has greater oxidizing properties than air and common diatomic oxygen.

The use of ozone alone is not sufficient, and ozone generators are more or less complicated, so its use has not been greatly generalized.

The use of humidified air, by water evaporation, and its mixture in the carburetor with fuel, has been fully tested and found useful.

The efficient use of humidified air to be added to the common mixture of fuel and air may be due to the thermodynamic action of the steam generated by the water molecules as the fuel mixture is ignited. Possibly it is also due to the enrichment of said fuel mixture by the oxygen and hydrogen yielded by the water molecules as disassociated, and which combine with the fuel mixture during its combustion.

Observing the advantages of the use of ozone and humidified air, as added to the fuel mixture of internal combustion engines, a device has been invented, which provides the simultaneous action of the three elements forming the combustion mixture, ozone, humidified air and the conventional fuel mixture, so that said device results in a complete combustion of the mixture, consequently increasing the power of the engine thus equipped.

The efficiency and economy provided by the device are more notable in those engines using heavy hydrocarbon fuels, which yield greater power at a lower cost.

It must be understood that this invention is not in any way limited to the use of liquid hydrocarbons, as it may be used in connection with engines utilizing gas fuels.

The possible interaction of the elements which are added to the fuel hydrocarbon has been previously implied, as used singly. Used in combination, as per this invention, it may be that their interaction remains the same, or that is more complex, the practical results being that there is a notable increase in power and a sensible reduction in fuel consumption.

Another object of this invention is to provide a device of simplified design and construction, which allows the development of said process, that is, the simultaneous generation of ozone by electrical means, and the saturation of the atmospheric air with water vapor, to be used with the conventional fuel mixture.

A further object of the invention is to provide a device, which does not use moving parts, and consequently is not subject to wear.

A further object of this invention is to provide a device, which comprises means for properly saturating an air mass with water vapors for its utilization in the composition of a fuel mixture.

A further object of the invention is to provide a device, which comprises means to keep a constant level of the water used for humidity saturation of an air mass.

Still a further object of the invention is to provide a device to make possible a fuel mixture having improved combustion, and which may be adapted to the air inlet of the conventional carburetors.

With the foregoing objects and others which may hereinafter appear, the invention consists in the novel construction, combination and arrangement of parts of a device, as will be more specifically referred to and illustrated in the accompanying drawings, but it is to be understood, that changes and modifications may be resorted to, which fall within the scope of the invention as claimed.

Figure 1:
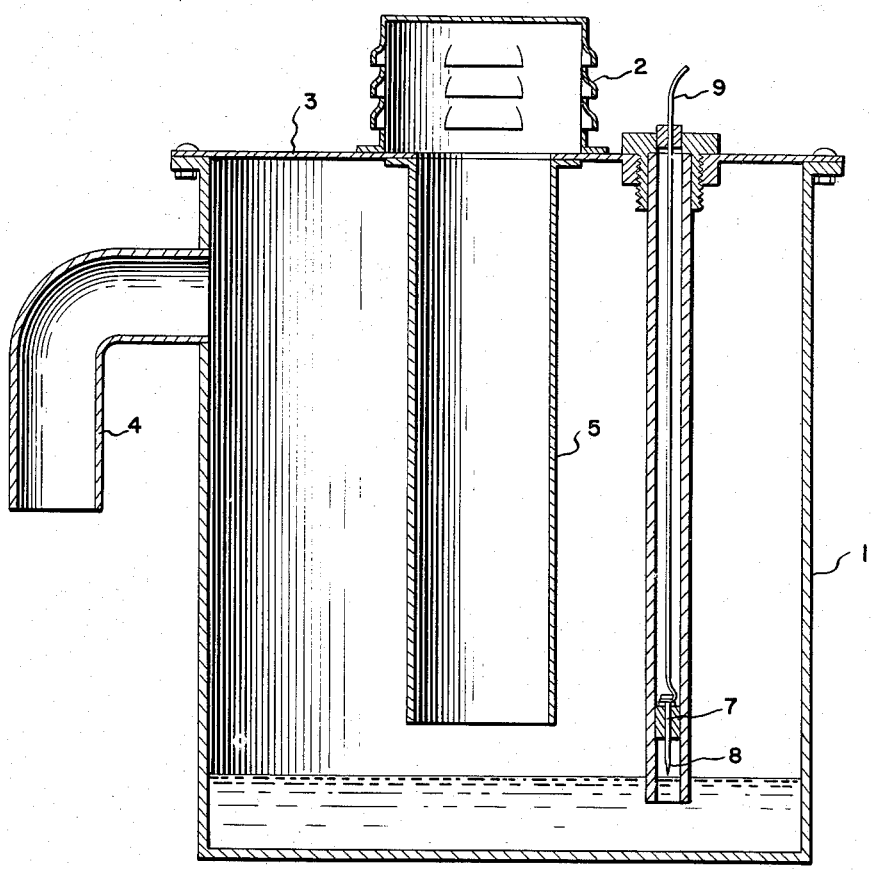
Figure 1 is a sectional side view of the device for developing the process to improve the combustion of a fuel mixture, showing the design and construction, and relative position of the component elements.

Essentially the invention refers to a device comprising means for introducing atmospheric air to a chamber for its saturation with water vapor and its mixture with ozone, electrically generated, operations which take place simultaneously, in order to provide in the carburetor of the internal combustion engine, an enriched mixture which allows the more complete combustion of the light or heavy hydrocarbon fuel and reduces fuel consumption for a given power rating.

The invention also refers to a device, which comprises in combination, a container provided with inlet means for the atmospheric air and water, outlet means for the enriched saturated air mass; means for saturating said air mass with water vapor and the simultaneous generation of ozone, for its combination with said humidified air. One embodiment of the invention comprises filter means for the atmospheric air, and constant level means for the water in the container.

This step of properly humidifying an air mass, takes place simultaneously with the generation of ozone, by electrical means, for its combination with the saturated air mass. The generation of ozone may be on the water surface, at the water level or under it.

The ozone thus generated immediately forms part of the humidified air mass.

Thus, this device provides the means for the simultaneous action of the three elements which constitutes the fuel mixture: ozone, humidified air and conventional hydrocarbon fuel, which results in the increase in engine power and reduced fuel consumption.

The device consists in the novel combination of a container comprising an outer housing 1, provided with inlet means 2, on its upper side or top 3, detachable or not.

Container 1 is also provided with outlet means 4 for the enriched air mass.

The forced circulation of the air over the surface of the water in container 1, for its humidity saturation is obtained by means of tube 5, which has its lower end at a short distance from the water surface, so that a proper saturation is obtained.

The provision of ozone for the enrichment of the humidified air mass, as a simultaneous operation with the saturation of air with water vapor, is obtained in the device by means of electrode 7, properly secured to grounded container 1. The lower end 8 of said electrode is placed at a certain distance from the water surface, at water level or under it, so that the application of an electric current through conductor 9 generates a spark capable of producing ozone in adequate amounts.

Figure 2:
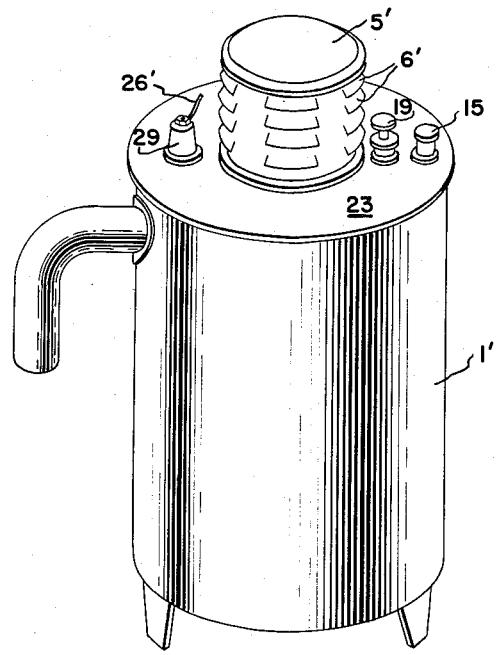
Figure 2 is a perspective view of the device according to another embodiment of the invention, showing the filter means at the air intake, saturated gas mixture outlet, electrode connecting means and water inlet.
Figure 3:
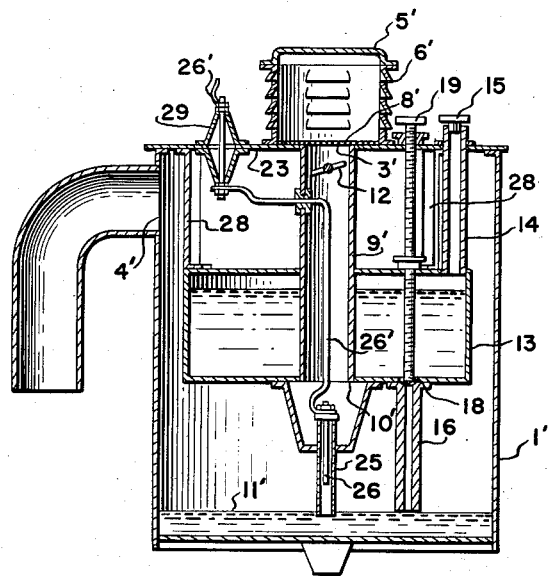
Figure 3 is a sectional side elevation of the embodiment of the invention illustrated in Figure 2, showing the relative position of the components, which comprise constant level means, and ozone generating electrode.

The embodiment of the invention illustrated in Figures 2 and 3, comprises a closed container 1', which provides an inlet 3' for the air mass, and an outlet 4' for the enriched mixture. A cover 5' provided with slots 6', as air inlets on the upper portion of container 1', said cover 5' being used as filter holding means. This filter means may be mineral, glass or asbestos wool, with a metal or cloth screen or grid 8', as additional filter on opening 3', at the upper end of air tube 9', of which the lower end 10' is placed at a short distance from the water surface 11' in container 1'.

The upper end of air tube 9' is provided with a flap valve 12, controlling the intake of air in the device according to the requirements of the engine.

Preferably at the center of the container 1', and around air tube 9' there is a water reservoir 13, with a water inlet tube 14, and cap 15. This reservoir holding the required amount of water is provided with a lower feed line 16, ending at the water surface, and keeping its level constant, as it is used by evaporation.

This water reservoir 13 is provided with an adequate valve 18, for adjusting the opening in feed line 16, and operated from outside the container by a knob 19.

This inside reservoir 13, of lesser diameter than container 1', provides space for the circulation of the humidified enriched air to the outlet 4', which connects with the carburetor through its conventional air intake.

This tank 13 is supported by spacers 28 properly secured to the top 23, which hermetically closes the upper opened end of container 1'.

The generation of ozone by electrical means, is provided in this embodiment of the invention by means of electrode 26 properly secured in insulating tube 25 which has its lower end at a certain distance from the water surface, at water level or under it. This insulating tube 25 is in turn provided with a terminal to which a conductor 26' is attached, said conductor in turn passing through insulator 29 at the top or cover 23 of grounded container 1' for its connection with the electrical system of the engine. The electrical generation of ozone is obtained by a spark which as specified may be produced on the water surface, at water level or under it, by the application to the electrode of a high tension electric current.

The operation of this device is as simple as its construction. Thus, the component elements in the illustrated relative position, the inner reservoir 13 is filled by completely closing valve 18, by screwing knob 19. Opening said valve allows the water to circulate in feed line 16, filling the container 1' to the level set by the distance of the lower end of the feed line from the bottom of the container. With water at proper level, and conductor 26 properly connected to the high tension circuit of the vehicle or engine, the device is ready to operate, humidifying the air mass and enriching it with the ozone as it passes to the carburetor.

I claim:

1. In an apparatus for feeding enriched air to the carburetor of an internal combustion engine the combination of an atmospheric air treatment chamber; an inlet for introducing a stream of atmospheric air into said chamber; a filter disposed in said inlet; means for humidifying the air at substantially atmospheric temperature including a water bath in said treatment chamber, a water reservoir in said treatment chamber, valve means for regulating the flow of water from said reservoir to the water bath thereby to maintain constant the water level of the bath; an electrical ozone generator in said treatment chamber comprising a high voltage electrode secured in said treatment chamber and insulated therefrom; said treatment chamber being grounded; and an outlet from said treatment chamber for feeding the treated air to the intake conduit leading from the carburetor.

2. In an apparatus for feeding enriched air to the carburetor of an internal combustion engine the combination of an air treatment chamber comprising a housing having an inlet for a stream or air, a filter disposed in said inlet, and an outlet for treated air; means for humidifying the air in said chamber at substantially atmospheric temperature, including a water bath contained in the housing at the base thereof, a water reservoir disposed in the housing above the water bath, valve means for regulating the flow of water from said reservoir to the bath thereby to provide means for maintaining the water level of the bath constant; and an electrical ozone generator for producing ozone in the air in said chamber comprising a high voltage electrode carried in said housing and electrically insulated therefrom, a conductor for connecting said electrode to a high voltage source, said conductor passing through an insulator mounted on an outer wall of said housing, said housing being grounded.

3. In an apparatus for feeding enriched air to the carburetor of an internal combustion engine the combination of an air treatment chamber comprising a closed container having a removable cover; an inlet for introducing a stream of air into said container including an air tube fastened to and depending from said cover into the chamber, the air tube being open to atmosphere through slots provided in said cover; a filter disposed in said inlet; means for humidifying the air at substantially atmospheric temperature including a water bath in the container at the base thereof, a water reservoir comprising a receptacle disposed in the container above the water bath, a feed line from the reservoir to the bath, a valve in said feed line for regulating the flow of water from said reservoir to the bath thereby to provide means for maintaining the water level of the bath constant; an electrical ozone generator comprising a high voltage electrode carried in said container and electrically insulated therefrom, a conductor for connecting said electrode to a high voltage source, said conductor passing through an insulator mounted in the cover of said container, said container being grounded; and an outlet pipe from said container for feeding the treated air to the air intake conduit leading from the carburetor.

References Cited in the file of this patent

UNITED STATES PATENTS

| 1,170,069 | Ihrig | Feb. 1, 1916 |
| 1,257,053 | Warman | Feb. 19, 1918 |
| 2,208,673 | Hopkins | July 23, 1940 |

FOREIGN PATENTS

| 721,354 | France | Mar. 2, 1932 |